US010189334B2

(12) United States Patent
Imaizumi et al.

(10) Patent No.: US 10,189,334 B2
(45) Date of Patent: Jan. 29, 2019

(54) REGISTER

(71) Applicant: TOYOTA JIDOSHA KABUSHIKI KAISHA, Toyota-shi, Aichi-ken (JP)

(72) Inventors: Yoshitaka Imaizumi, Toyota (JP); Kentaro Kaneda, Toyota (JP); Nobuya Sakimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 14/959,427

(22) Filed: Dec. 4, 2015

(65) Prior Publication Data

US 2016/0167484 A1 Jun. 16, 2016

(30) Foreign Application Priority Data

Dec. 11, 2014 (JP) .................................. 2014-250468
Oct. 19, 2015 (JP) .................................. 2015-205498

(51) Int. Cl.
*B60H 1/34* (2006.01)

(52) U.S. Cl.
CPC ... *B60H 1/3421* (2013.01); *B60H 2001/3464* (2013.01)

(58) Field of Classification Search
CPC ........ B60H 1/246; B60H 1/241; B60H 1/242; B60H 2001/3464; B60H 1/3421; B60H 1/34; F24F 13/15
USPC ........................................ 454/143, 152, 155
See application file for complete search history.

(56) References Cited

U.S. PATENT DOCUMENTS

| | | | |
|---|---|---|---|
| 4,957,036 A * | 9/1990 | Fujihara | B60H 1/3421 454/155 |
| 2011/0237176 A1* | 9/2011 | Shibata | B60H 1/3428 454/330 |
| 2014/0261822 A1* | 9/2014 | Haupt | B60H 1/00678 137/803 |

FOREIGN PATENT DOCUMENTS

| JP | H01-169755 U | 11/1989 |
|---|---|---|
| JP | H02-2220 U | 1/1990 |
| JP | H02-60009 U | 5/1990 |
| JP | 2000-130833 A | 5/2000 |
| JP | 2000130833 A * | 5/2000 |
| JP | 2002-340392 A | 11/2002 |
| JP | 2006-170509 A | 6/2006 |
| JP | 2006170509 A * | 6/2006 |

(Continued)

OTHER PUBLICATIONS

Jan. 24, 2017 Office Action issued in Japanese Patent Application No. 2015-205498.

(Continued)

*Primary Examiner* — Steven B McCallister
*Assistant Examiner* — Ko-Wei Lin
(74) *Attorney, Agent, or Firm* — Oliff PLC

(57) ABSTRACT

In the register 1 of the embodiment, in case that all of the front side fins 41 are rotated to the upward direction, air flowing toward the air outlet 21 (air flow direction X) of the bezel 2 in the air flow path 3A of the retainer 3 is blown out from the air outlet 21 of the bezel 2 and the blowout direction is changed to Y1. At that time, air flow separating from the concave surface existing on the lower surface of the front side fin 41 approaches to air flow along the concave surface existing on the upper surface of the front side fin 41 positioned at a lower position than that of the above front side fin 41, and separates from the fixed fin 22. Thereby, air (Continued)

with superior directivity to the upper direction can be obtained.

7 Claims, 27 Drawing Sheets

(56) References Cited

FOREIGN PATENT DOCUMENTS

| | | | | |
|---|---|---|---|---|
| JP | 2008001151 A | * | 1/2008 | ........... B60H 1/3414 |
| JP | 2014210502 A | * | 11/2014 | |

OTHER PUBLICATIONS

Jul. 12, 2016 Office Action issued in Japanese Patent Application No. 2015-205498.
Aug. 29, 2017 Office Action issued in Chinese Patent Application No. 2017082401556430.
Mar. 6, 2018 Office Action issued in Japanese Patent Application No. 2017-081238.
Mar. 22, 2018 Office Action issued in Chinese Patent Application No. 201510918734.2.
Aug. 30, 2018 Office Action issued in Chinese Patent Application No. 201510918734.2.

* cited by examiner

C-C

B-B (a)

(b)

(c)

REGISTER

BACKGROUND OF THE INVENTION

1. Field of the Invention

The present invention relates to a register with fixed fins and movable fins.

2. Description of Related Art

Conventionally, as a register arranged on an instrument panel of a car, it is well-known a register disclosed in Japanese publication laid open No. 2006-170509. In such register, air provided therein is blown out from an air outlet, and there are arranged therein a group of movable fins to change air blowing direction from the air outlet. Further, in such register, the movable fins are arranged behind fixed fins which laterally divides the air outlet into a plurality of outlet parts, and a rotatable shaft of each movable fin is shifted toward each fixed fin.

As mentioned, in the register explained in the above, since the movable fins changing the air direction blown out from the air outlet are arranged behind the fixed fins laterally dividing the air outlet into a plurality of parts, and the rotatable shaft of each movable fin is shifted toward each fixed fin, the air blowing direction changed by each of the movable fins is scarcely affected through each of the fixed fins when each of the movable fins is rotated around the rotatable shaft.

However, although the air blowing direction changed by each of the movable fins is scarcely affected through each of the fixed fins, it is recently demanded the register through which affection by the fixed fins so as not to change the air blowing direction after passing through the movable fins can be further reduced.

SUMMARY OF THE INVENTION

The present invention has been made to dissolve the above problem and has an object to provide a register through which change of the air blowing direction conducted for the air blown in an air flow path of retainer by the movable fins can be effectively reduced, thereby directivity of the air blowing direction blown out from the air outlet in a bezel can be improved.

According to one aspect of the present invention, it can be proposed a register comprising:

a bezel having an air outlet formed therein;

a retainer having an air flow path along which an air flow toward the air outlet occurs and which communicates with the air outlet;

a movable fin having a plate-like shape for changing a blowout direction of air sent into the air flow path of the retainer and blown out from the air outlet;

a pair of rotational shafts for rotatably support the movable fin, the rotational shafts being formed at side ends of the movable fin and positioned at downstream side along an air flow direction on the side ends; and a fixed fin positioned near the air outlet of the bezel along an axis passing through the pair of rotational shafts;

wherein an edge portion of the movable fin positioned at downstream side along the air flow direction is arranged near an edge position of the fixed fin positioned at upstream side along the air flow direction, both edge portions being separated with a clearance therebetween, wherein both upper and lower surfaces of the movable fin are made dent curved surfaces which are gradually curved in a bow shape along the air flow direction, and wherein a thickness of the movable fin is made minimum at an almost center portion along the air flow direction.

Here, it may be conceivable in the above register, wherein a sectional shape of the fixed fin is formed so as to gradually become thinner from the upstream side toward the downstream side along the air flow direction.

Furthermore, it may be conceivable in the above register, wherein the edge portion of the movable fin positioned at the downstream side along the air flow direction and the edge position of the fixed fin positioned at the upstream side along the air flow direction has a parallel relation therebetween.

According to the above register, when the movable fin with the plate-like shape faces to the air flow direction with some angles (not parallel with the air flow direction), air flow sent in the air flow path of the retainer is changed along one of the upper and lower surfaces of the movable fin. That is to say, such air flow is changed along one of the dent curved surfaces which are gradually curved in a bow shape and have a minimum thickness at near almost center portion of the movable fin along the air low direction, thereafter air is blown out from the air outlet of the bezel. Thereby, change conducted by the movable fin against the air flow sent in the air flow path of the retainer is scarcely affected by the fixed fin, as a result, influence for air flow by the fixed fin can be effectively reduced. Thus, directivity of the air blowing direction blown out from the air outlet in the bezel can be improved.

Further, in case that the sectional shape of the fixed fin is formed so as to gradually become thinner from the upstream side toward the downstream side along the air flow direction, change for air flow sent in the air flow path of the retainer by the movable fin is further scarcely affected by the fixed fin.

Furthermore, in case that the edge portion of the movable fin positioned at the downstream side along the air flow direction and the edge position of the fixed fin positioned at the upstream side along the air flow direction has a parallel relation therebetween, a shape of the fixed fin positioned at the downstream side of the air flow direction can be flexibly changed while using in common the movable fin in the register of other model.

DETAILED DESCRIPTION OF THE PREFERRED EMBODIMENTS

[1. Register]

Hereafter, the register according to the present invention will be described with reference to the drawings, based on one embodiment. First, an outline construction of the register according to the embodiment will be described with reference to FIGS. 1 to 7

Figure 1:
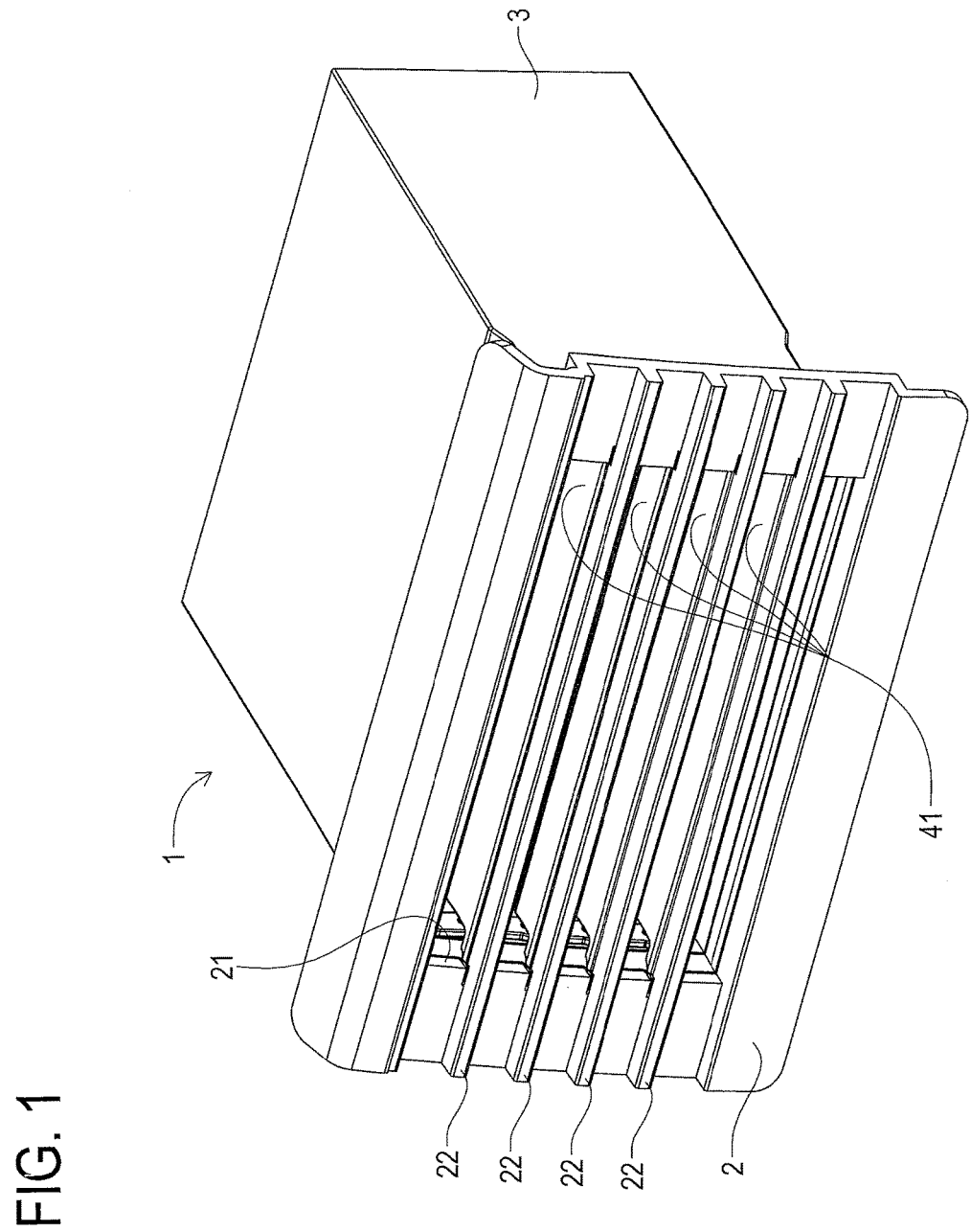
FIG. 1 is a perspective view of the register according to one embodiment of the present invention.

As shown in FIG. 1, the register 1 of the embodiment has a bezel 2 and a retainer 3. In the bezel 2, an air outlet 21 and four fixed fins 22 are formed. Here, within the air outlet 21, each of the fixed fins 22 is laterally extended over the air outlet 21 while retaining the same clearance between two adjacent fixed fins 22.

Behind the fixed fins 22, front side fins 41 are arranged within the retainer 3. Here, each of the front side fins 41 is laterally arranged along each of the fixed fins 22. Each of the front side fins 41 is rotatably supported. A detailed construction of front side fin 44 will be described hereinafter. Further, to the front side of the second upper fixed fin 22, an operation knob (not shown in the drawings) is inserted so as to sandwich the fixed fin 22 and be connected to the front side fine 41.

Figure 2:
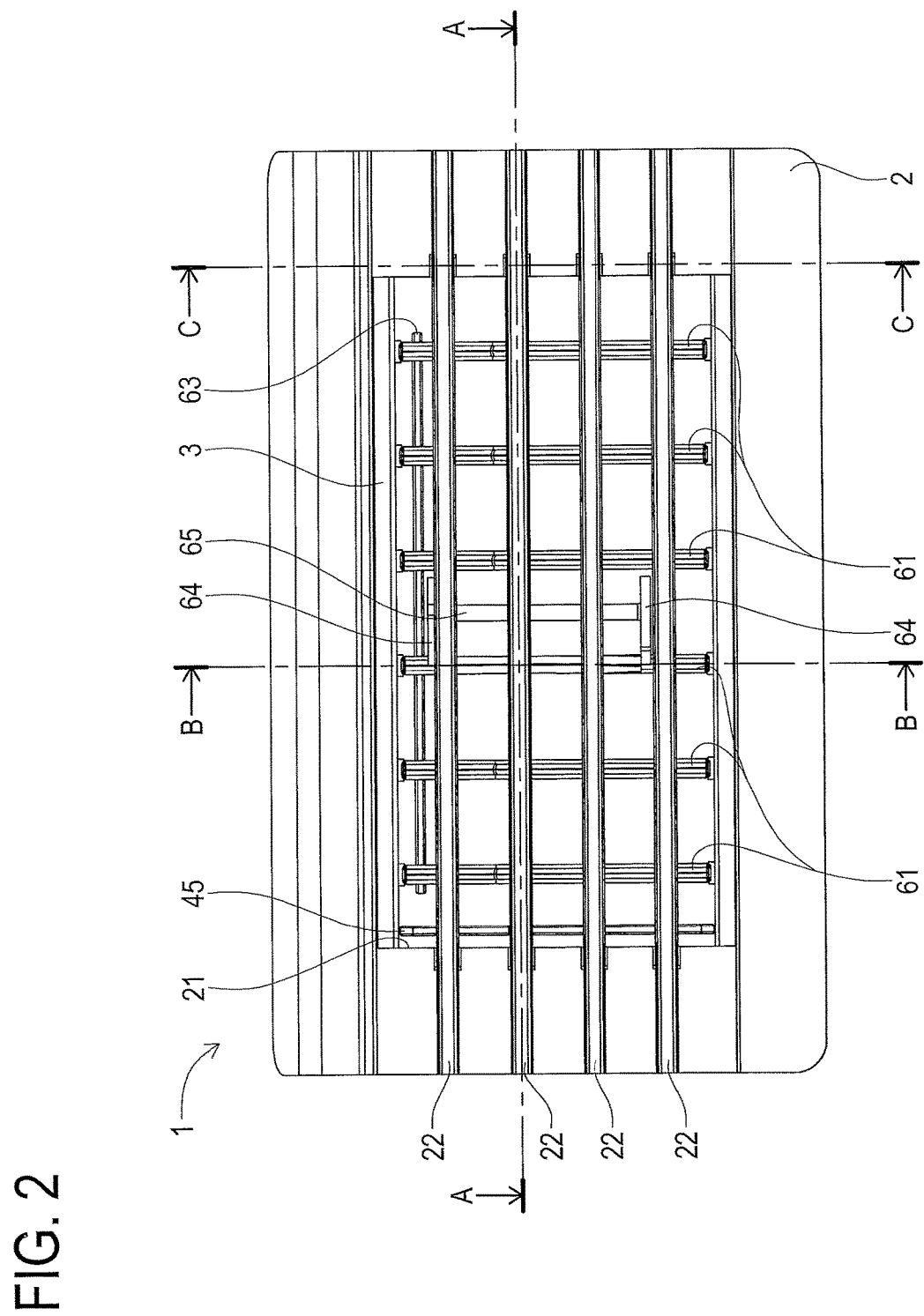
FIG. 2 is a front view of the register.
Figure 3:
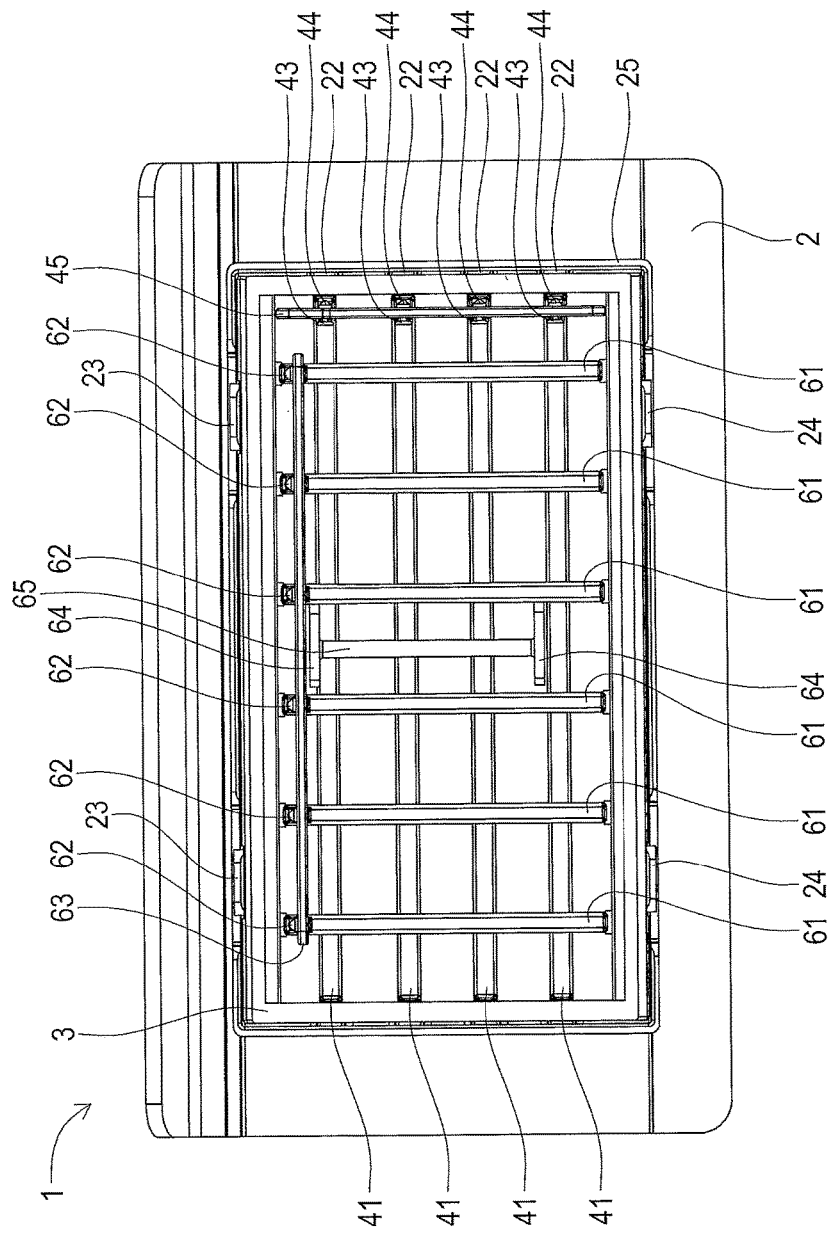
FIG. 3 is a rear view of the register.

As shown in FIGS. 2 and 3, behind the front side fins 41, six rear side fins 61 are vertically arranged while retaining the same clearance between two adjacent rear side fins 61. At an upper end of each rear side fin 61, a connection shaft 62 is formed. Each connection shaft 62 is supported on a connection rod 63.

From the rear side fin 61 positioned at the third position from the right side in FIG. 3 (that is, the third position from the left side in FIG. 2), a pair of protrusion plates 64 are laterally protruded. Between the protrusion plates 64, a connection rod 65 is formed. Further, at the rear side of the operation knob, a pair of connection sections (not shown) are formed, and the connection rod 65 is inserted between the connection sections so that the connection rod 65 becomes slidable. Here, such connection mechanism between the connection rod 65 and the connection sections is well-known, thus detailed explanation will be omitted.

Here, the member numbered as 45 shown in FIGS. 2 and 3 will be described hereinafter. Further, members numbered as 23, 24, 25, 43 and 44 will be also described hereinafter.

Figure 4:
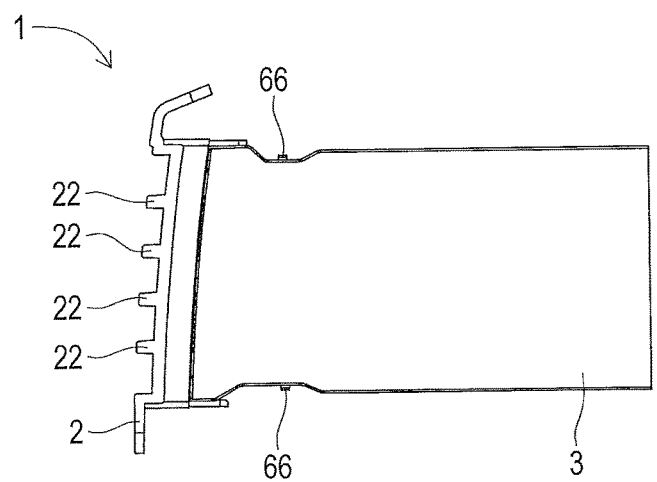
FIG. 4 is a right side view of the register.
Figure 5:
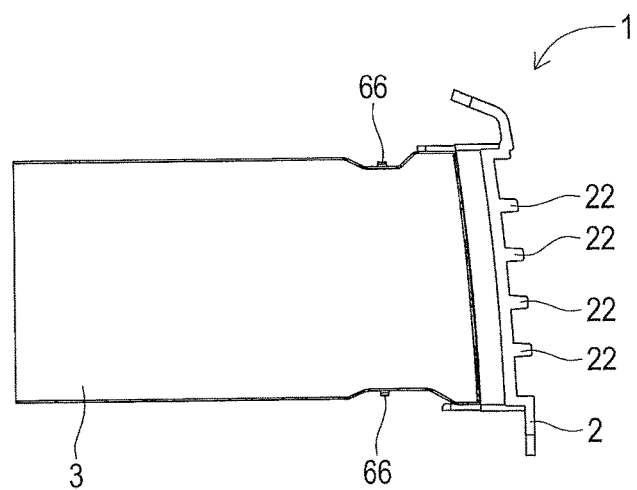
FIG. 5 is a left side view of the register.

To both the uppermost end and lowermost end, a pair of rotation shafts 66 are formed as shown in FIGS. 4 and 5. The rotation shafts 66 are rotatably supported in the retainer 3. That is to say, as shown in FIGS. 6 and 7, six rear side fins 61 are rotatably supported in the retainer 3, based on that the pair of rotation shafts 66 are rotatably supported at the upper and lower walls of the retainer 3.

In the six rear side fins 61, when the operation knob is operated in the lateral direction, movement of the operation knob is transmitted to the third rear side fin 61 counted from the right side in FIG. 3 (that is, from the left side in FIG. 2) through the connection sections formed in the operation knob, the protrusion plates 64 and connection rod 65 formed in the rear side fin 61. Based on such movement transmission of the operation knob, the third rear side fin 61 counted from the right side in FIG. 3 (from the left side in FIG. 2) is rotated, thereby the other rear side fins 61 are rotated at the same time through cooperation of the connection shafts 62 and the connection rod 63. Accordingly, all of the rear side fins 61 are made in the same rotational state.

Figure 6:
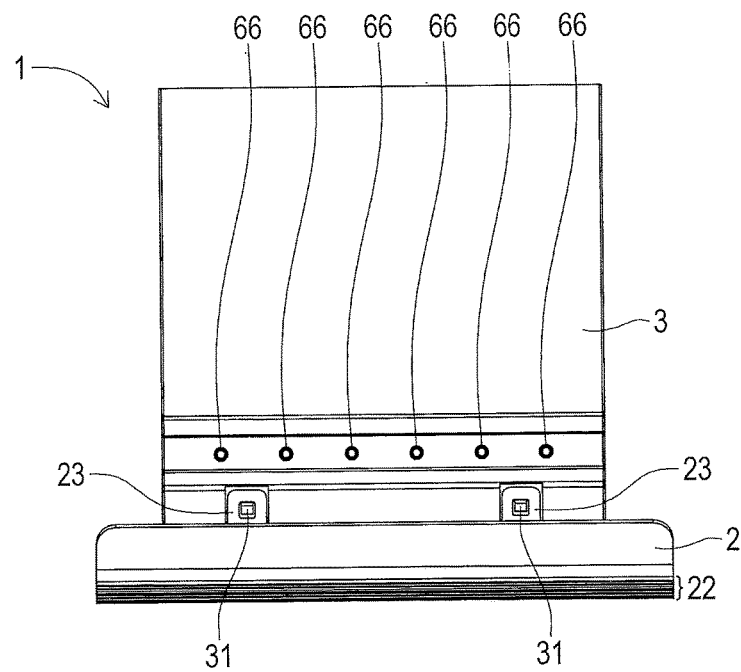
FIG. 6 is a plan view of the register.
Figure 7:
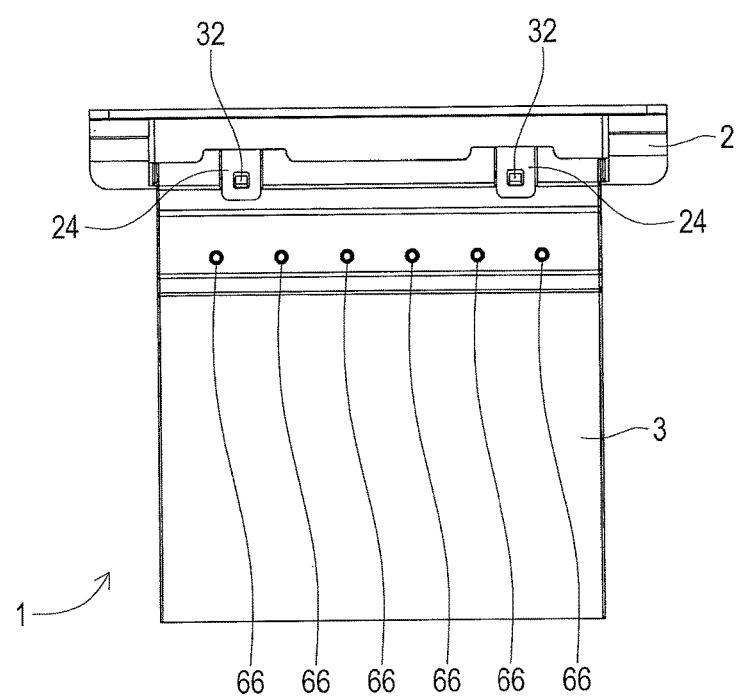
FIG. 7 is a bottom view of the register.
Figure 8:
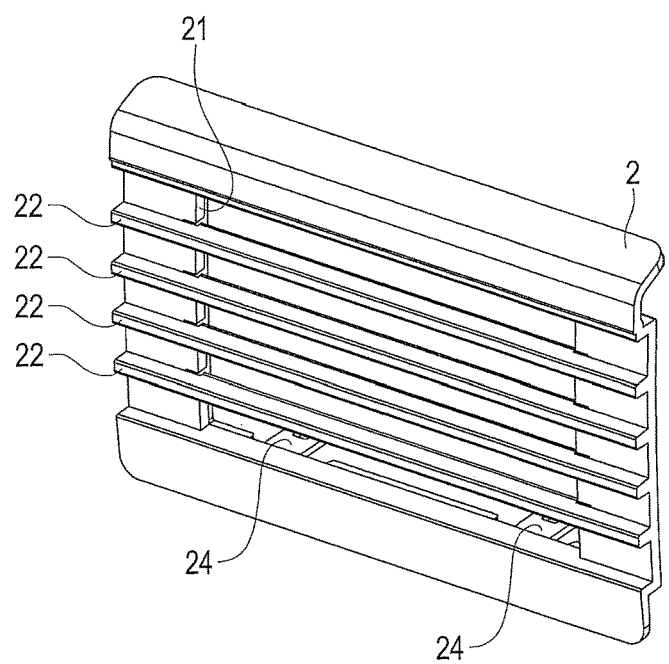
FIG. 8 is a front perspective view of a bezel provided in the register

As shown in FIG. 6, a pair of upper engagement sections 23 are formed on the upper side of the bezel 2, and a pair of bezel support parts 31 are formed on the upper side of the retainer 3. Further, as shown in FIG. 7, a pair of lower engagement sections 24 are formed on the lower side of the bezel 2, and a pair of lower bezel support parts 32 are formed on the lower side of the retainer 3. The pair of upper engagement sections 23 are engaged with the pair of upper bezel support parts 31 and the pair of lower engagement sections 24 are engaged with the pair of lower bezel support parts 32, thereby the bezel 2 and the retainer 3 are mutually fixed.

[2. Bezel]

As shown in FIGS. 8, 9 and 10 to 12, an air outlet 21 and four fixed fins 22 are formed at the front side of the bezel 2. Over the air outlet 21 in the lateral direction, the fixed fins 22 are bridged while retaining the same clearance between adjacent two fixed fins 22. At the rear side of the bezel 2, the pair of upper engagement sections 23 are formed at the upper side of the bezel 2 and the pair of lower engagement sections 24 are formed at the lower side.

Figure 9:
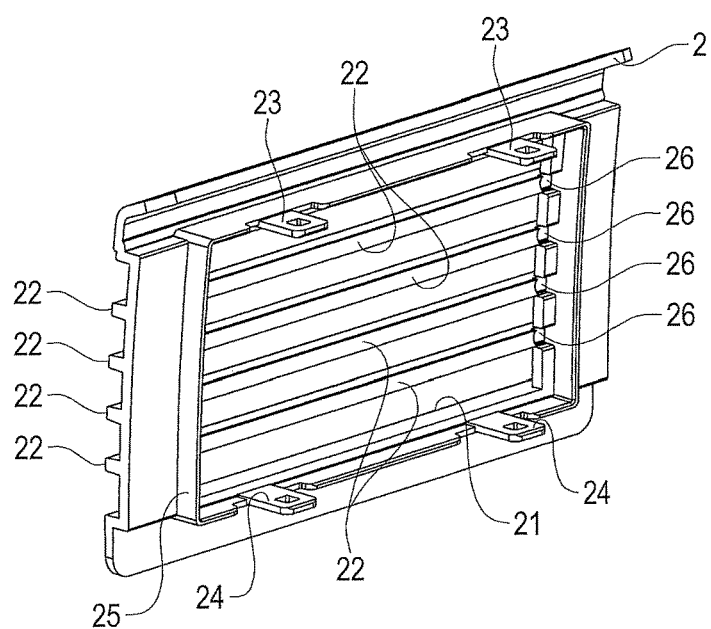
FIG. 9 is a rear perspective view of the bezel provided in the register.
Figure 10:
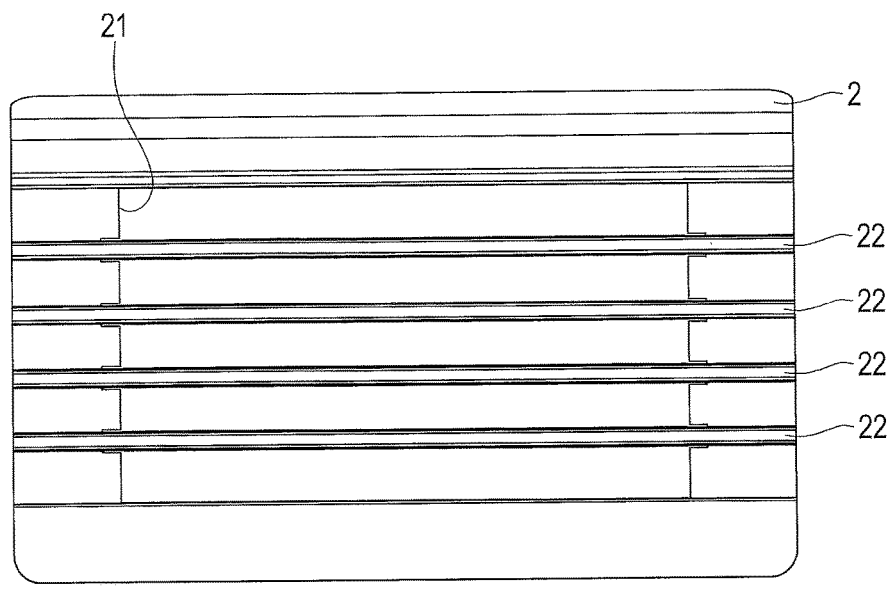
FIG. 10 is a front view of the bezel provided in the register.
Figure 11:
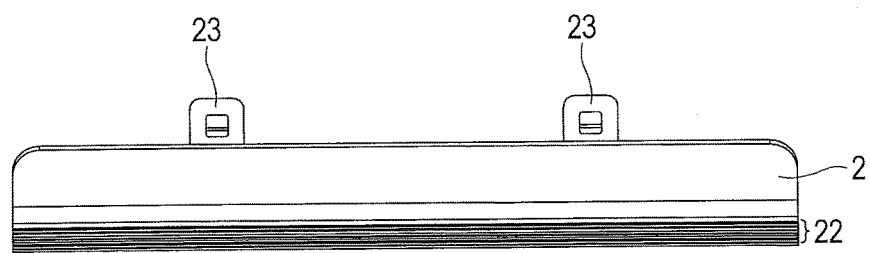
FIG. 11 is a plan view of the bezel provided in the register.
Figure 12:
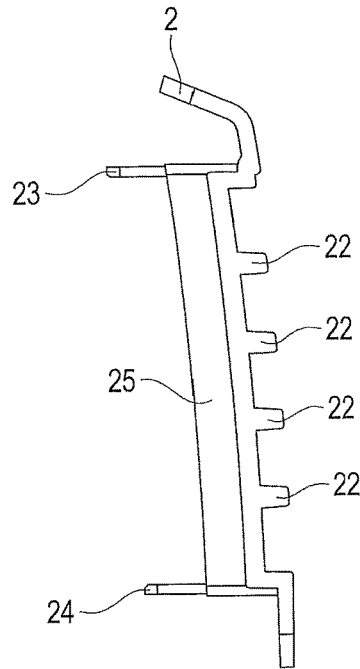
FIG. 12 is a side view of the bezel provided in the register.
Figure 13:
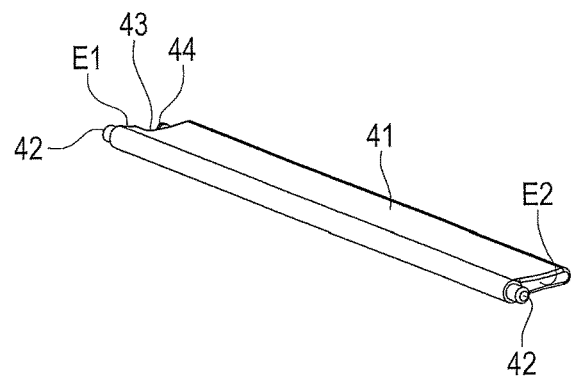
FIG. 13 is a front perspective view of a front side fin arranged in the register.
Figure 14:
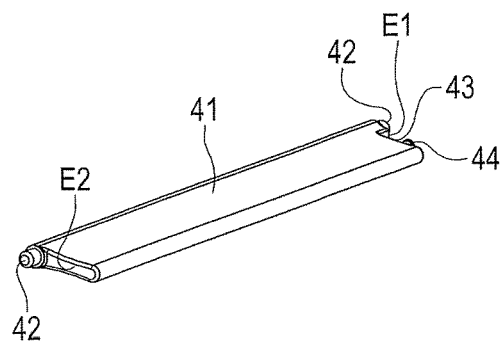
FIG. 14 is a rear perspective view of the front side fin arranged in the register.
Figure 15:
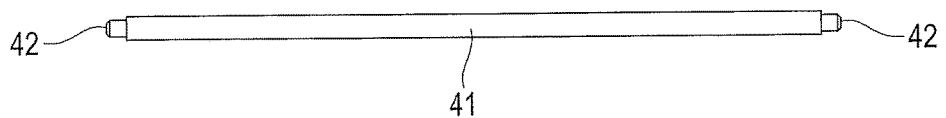
FIG. 15 is a front view of the front side fin arranged in the register.
Figure 16:
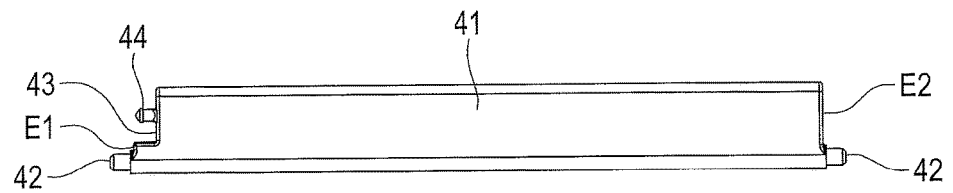
FIG. 16 is a plan view of the front side fin arranged in the register.
Figure 17:
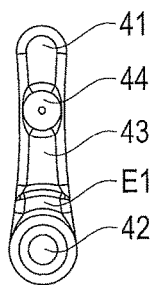
FIG. 17 is a side view of the front side fin arranged in the register.
Figure 18:
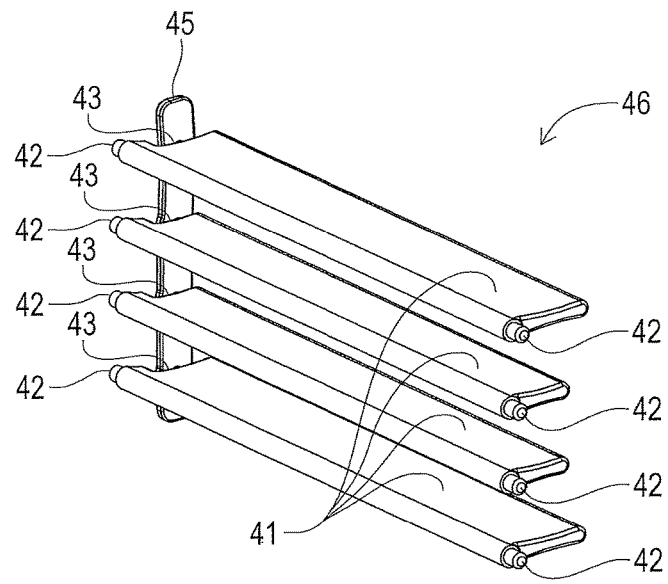
FIG. 18 is a front perspective view of a fin structure in which a group of the front side fins are arranged.
Figure 19:
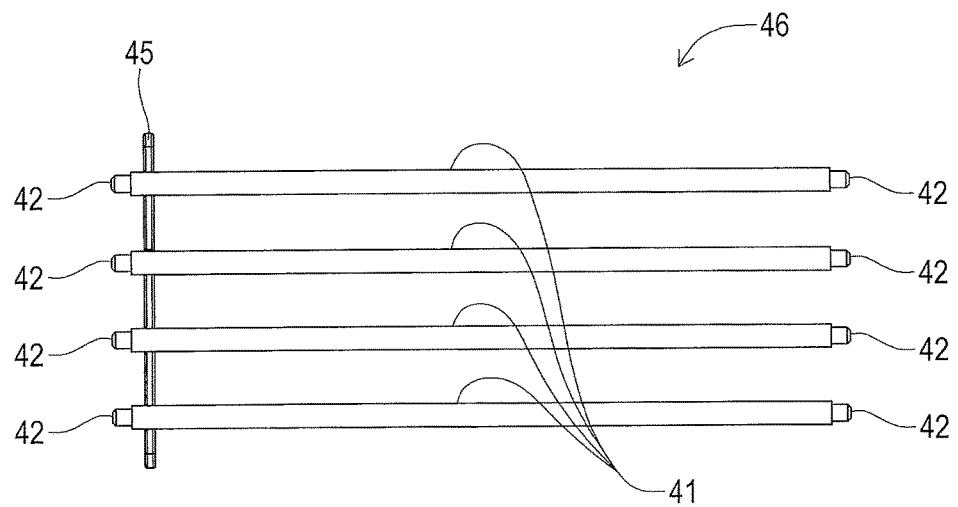
FIG. 19 is a front view of the group of front side fins arranged in the register.
Figure 20:
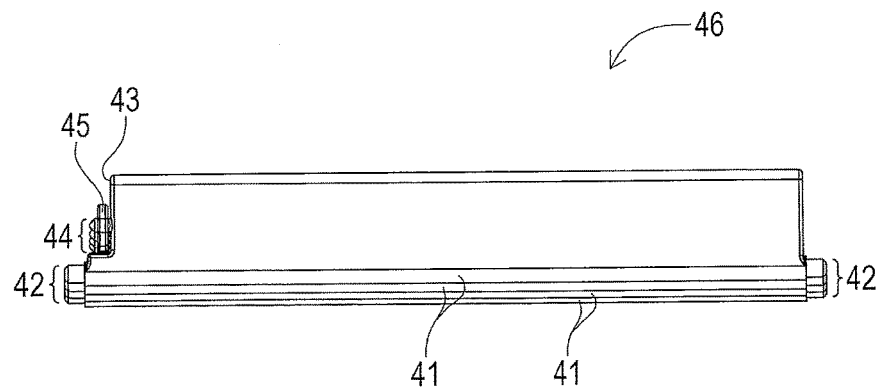
FIG. 20 is plan view of the fin structure in which the group of front side fins are arranged.

Especially, as shown in FIG. 9, on the rear face of the bezel 2, it is formed a surrounding rib 25 which surrounds the air outlet 21. Within the surrounding rib 25, concave fit portions 26 are formed correspond to both sides of each fixed fin 22. Each of the pair of upper engagement sections 23 and the pair of lower engagement sections 24 is formed as a part of the surrounding rib 25.

[3. Front Side Fins/Group of Front Side Fins]

As shown in FIGS. 13, 14 and 15 to 17, a front side fin 41 has a plate-like shape laterally elongated. At each side end surface E1, E2 of the front side fin 41, a rotational shaft 42 is formed. The rotational shaft 42 is positioned at a position shifted to one side (front side) on each of the side end surfaces E1, E2. At one side end surface E1, a notch 43 is formed. On the notch 43, a connection shaft 44 is laterally extended.

As shown in FIGS. 18 and 19 to 21, the connection shaft 44 formed in each of the front side fins 41 is supported in a connection rod 45. Thereby, a fin structure 46 for a group of the front side fins 41, in which four front side fins 41 are connected with each other through the connection rod 45, is assembled.

Figure 21:
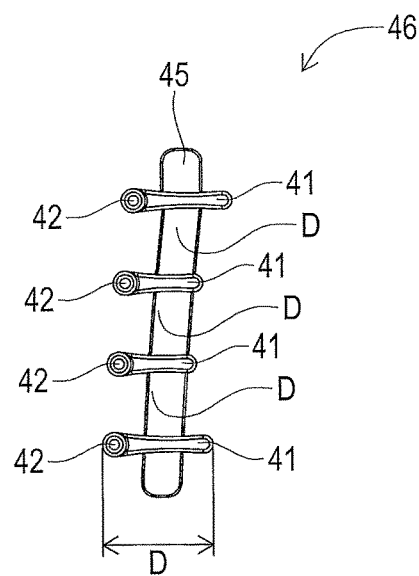
FIG. 21 is a side view of the fin structure in which the front side fins are arranged.
Figure 22:
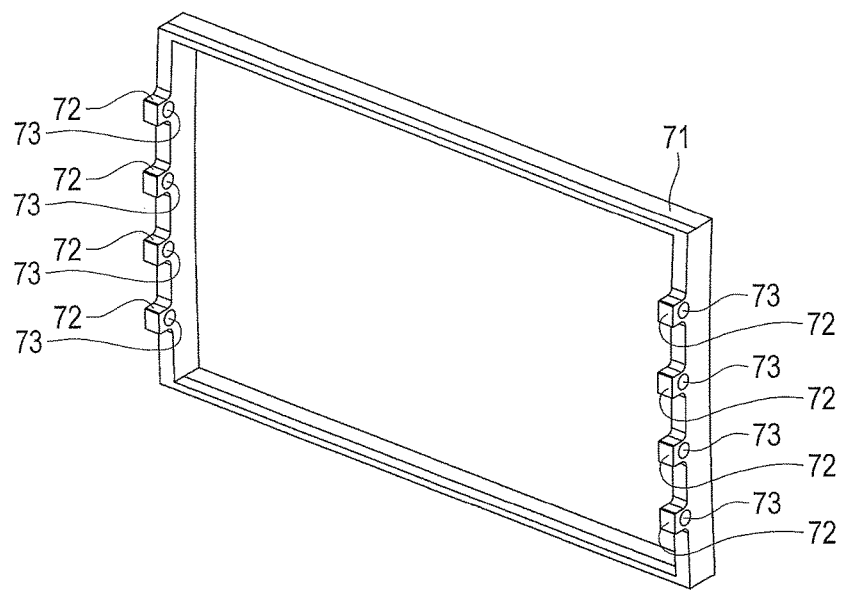
FIG. 22 is a front perspective view of a frame for the front side fins arranged in the register.
Figure 23:
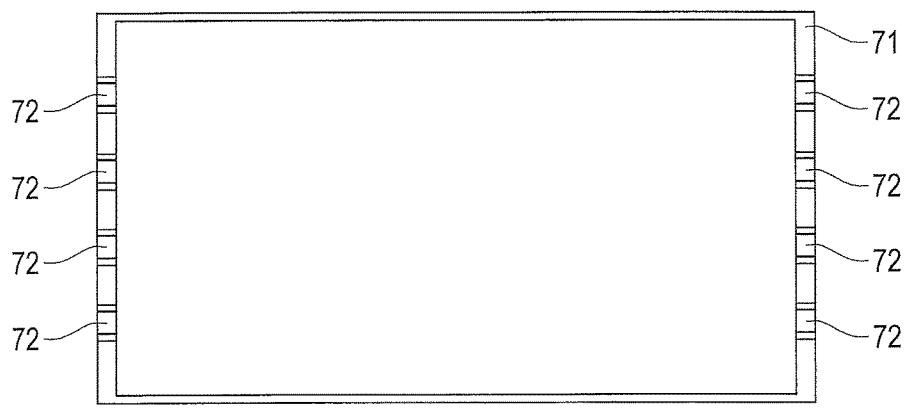
FIG. 23 is a front view of the frame for the front side fins arranged in the register.
Figure 24:
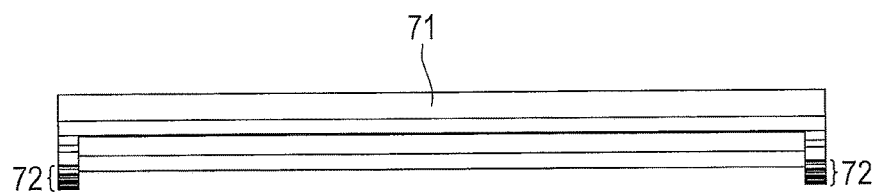
FIG. 24 is a plan view of the frame for the front side fins arranged in the register.
Figure 25:
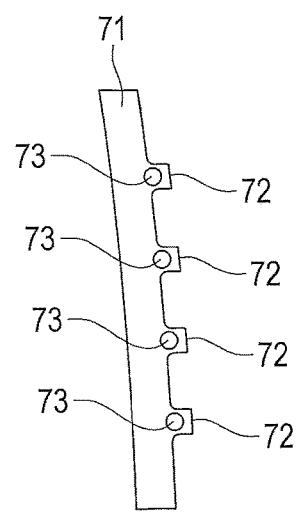
FIG. 25 is a side view of the frame for the front side fins arranged in the register.
Figure 26:
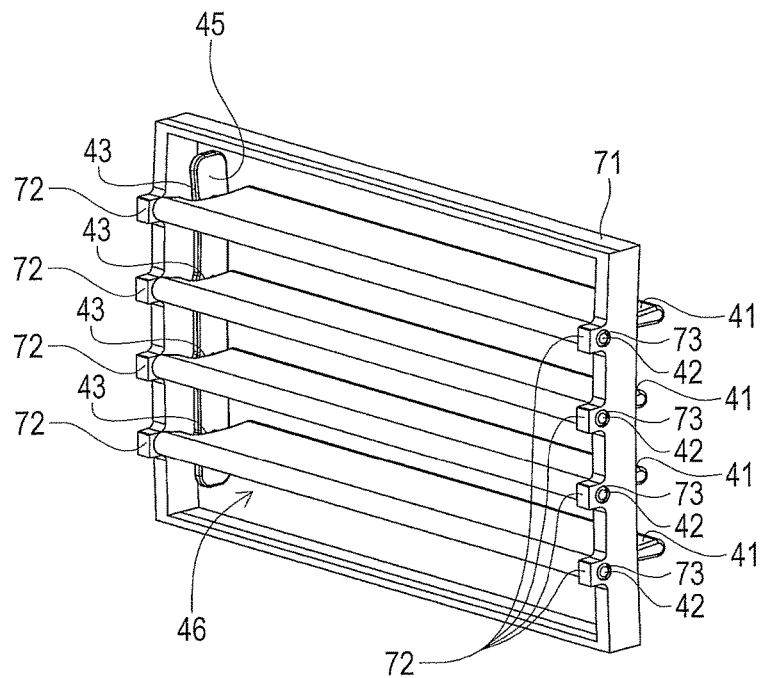
FIG. 26 is a front perspective view of the frame in which the front side fins are arranged.
Figure 27:
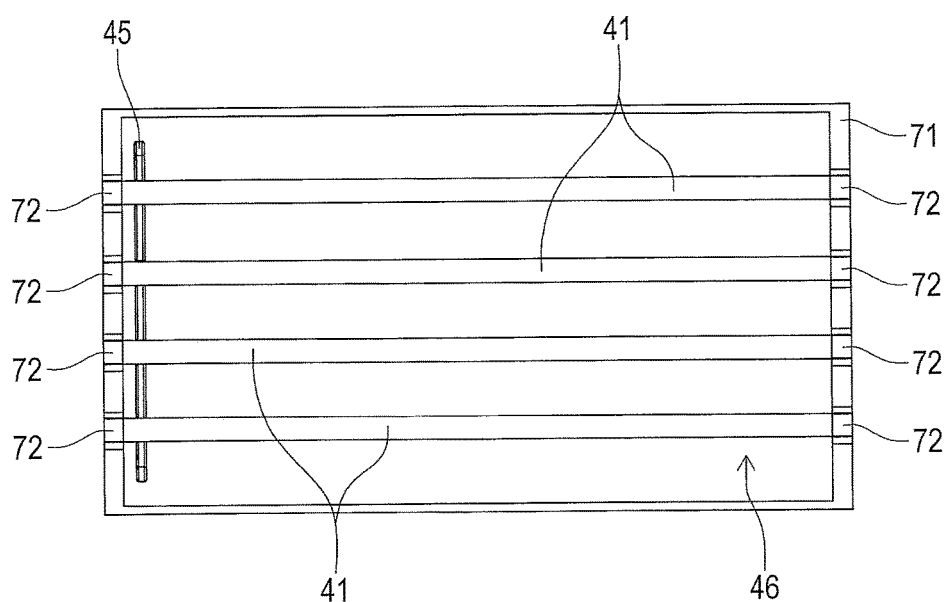
FIG. 27 is a front view of the frame in which the front side fins are arranged.
Figure 28:
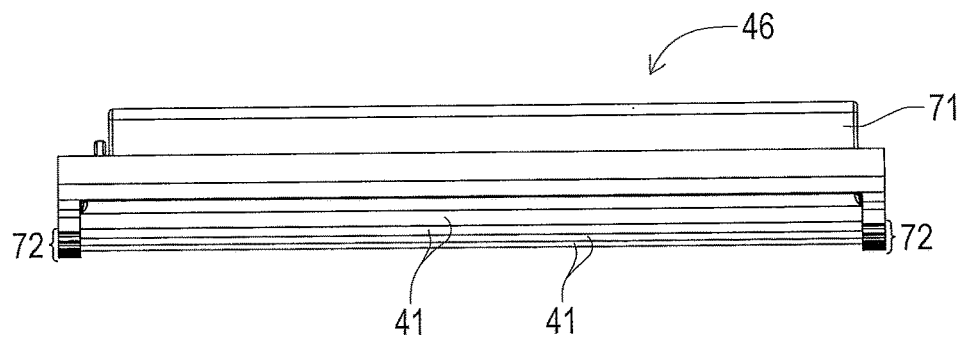
FIG. 28 is a plan view of the frame in which the front side fins are arranged.
Figure 29:
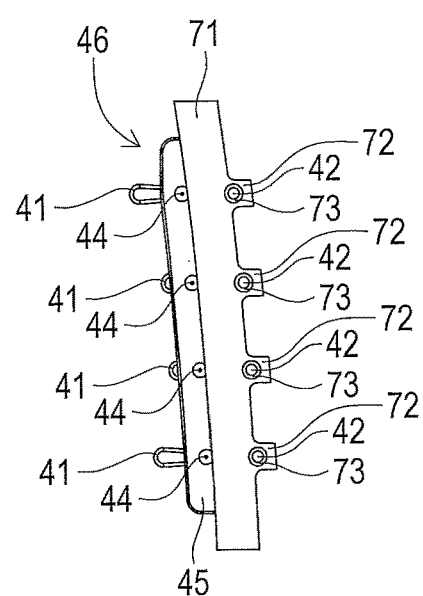
FIG. 29 is a side view of the frame in which the front side fins are arranged.

Here, as shown in FIG. 21, depths D of the first and fourth front side fin 41, counted from the upper side, are longer than the depths D of the second and third front side fins 41.

[4. Frame for Front Side Fins]

As shown in FIGS. 22, 23 to 25, a frame 71 for front side fins having a rectangular shape is disclosed. On a narrow side of the frame 71, four convex fit portions 72 are formed while providing the same clearance between two adjacent portions 72. Further, a shaft hole 73 is formed in each of the convex fit portions 72. Each of the shaft holes 73 formed in the convex fit portions 72 on one narrow side faces to each of the shaft holes 73 formed in the convex fit portions 72 on the other narrow side.

As shown in FIGS. 26 and 27 to 29, the fin structure 46 is fitted in the frame 71. Each of the rotational shafts 42 at both sides of each front side fin 41 is respectively fitted into each of shaft holes 73 formed in the convex fit portions 72 mutually facing on both narrow sides of the frame 71, so that the connection rod 45 is wholly received within the frame 71. Thereby, each of the front side fins 41 is rotatably supported while laterally retaining the same clearance between two adjacent fins 41.

Figure 30:
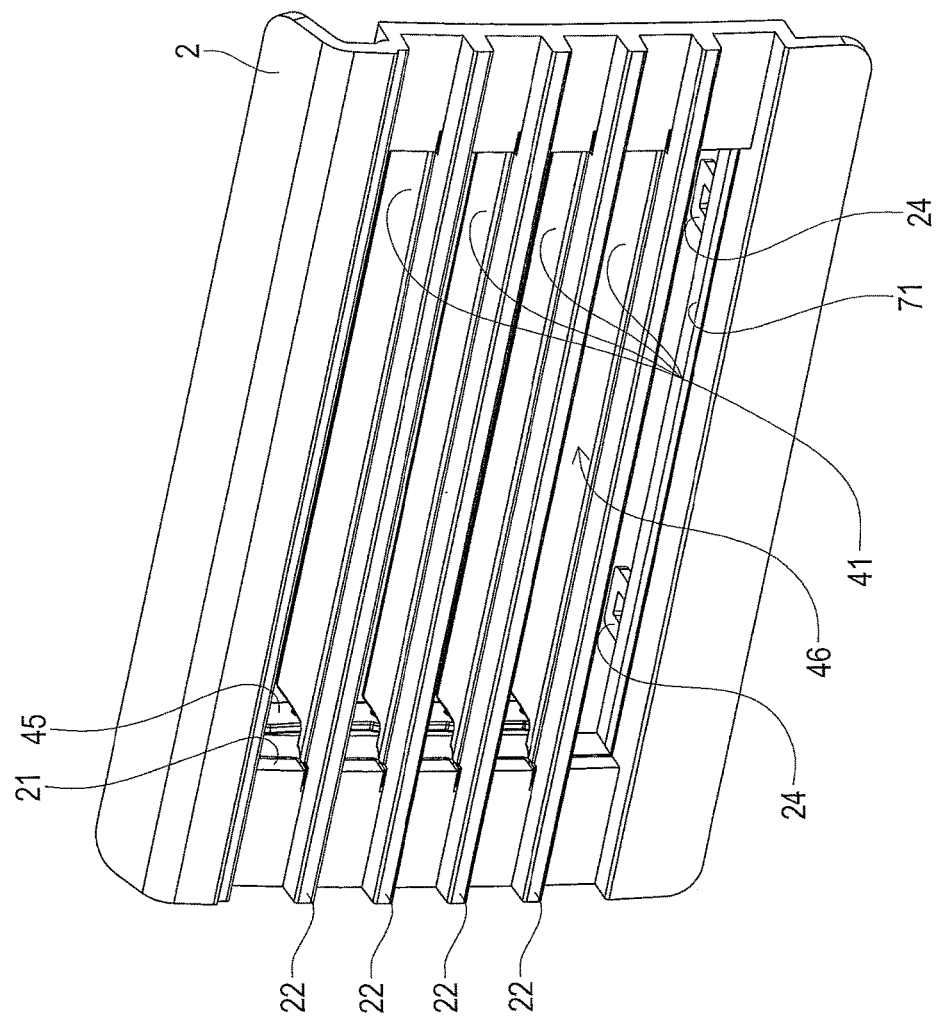
FIG. 30 is a front perspective view of the bezel in which the frame with the front side fins is arranged.
Figure 31:
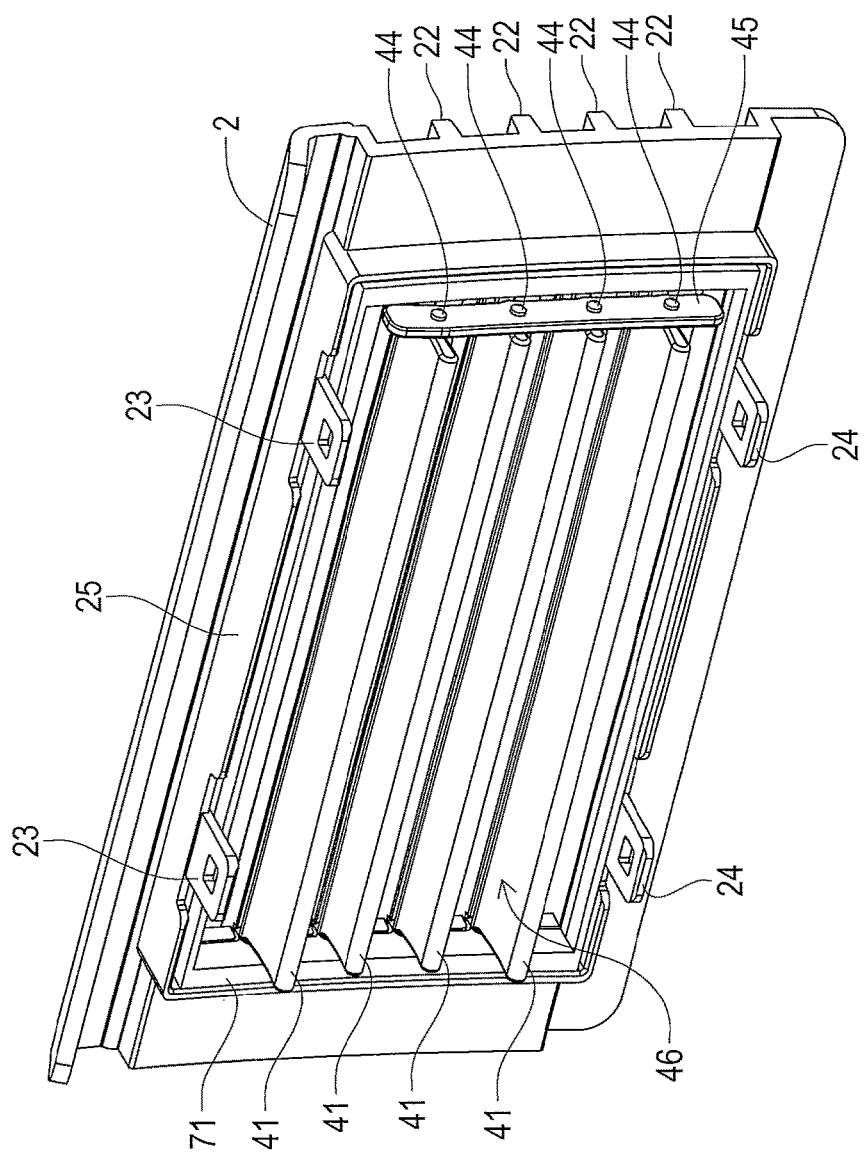
FIG. 31 is a rear perspective view of the bezel in which the frame with the front side fins is arranged.
Figure 32:
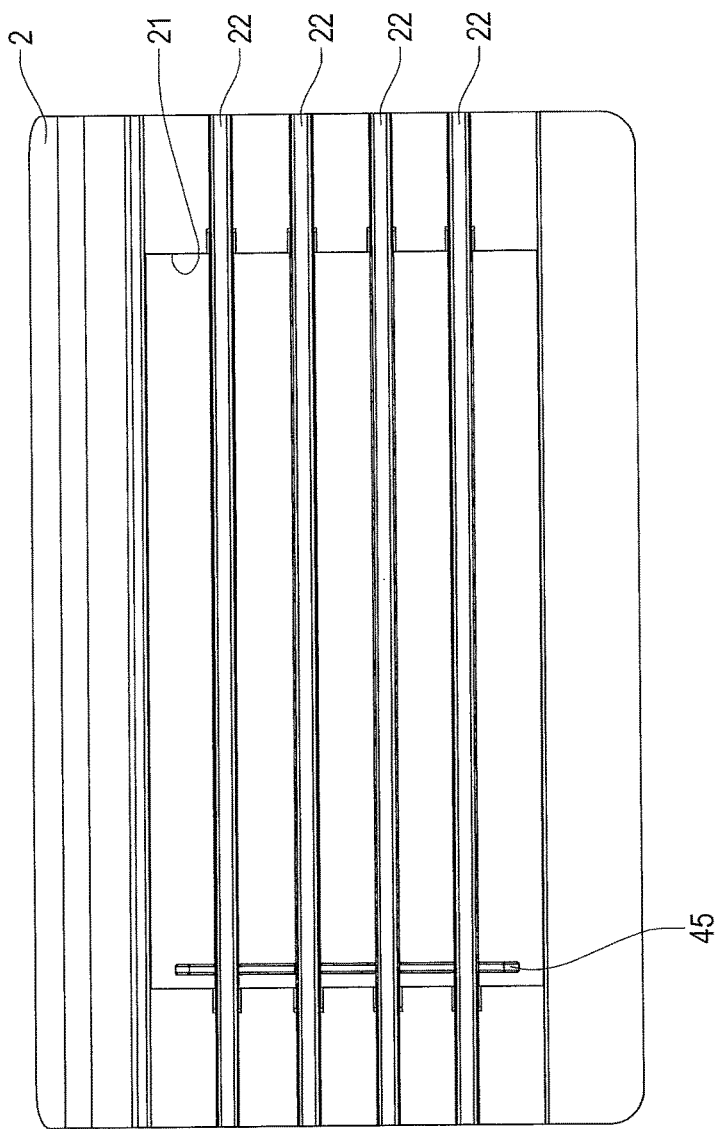
FIG. 32 is a front view of the bezel in which the frame with the front side fins is arranged.
Figure 33:
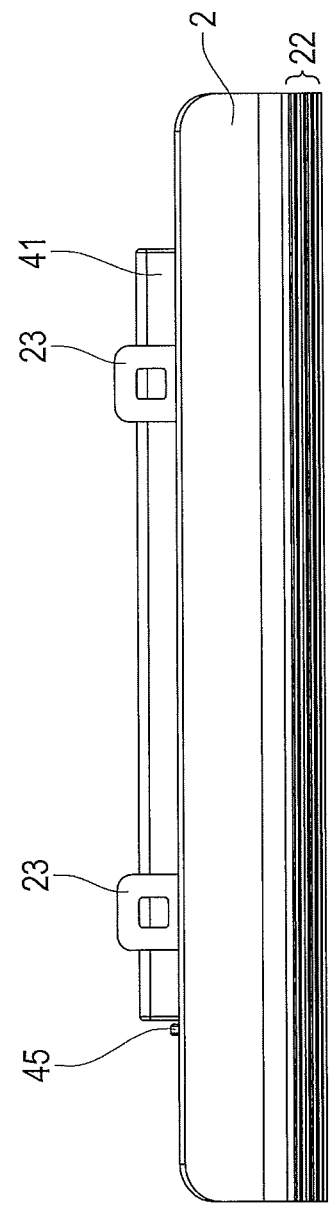
FIG. 33 is a plan view of the bezel in which the frame with the front side fins is arranged.
Figure 34:
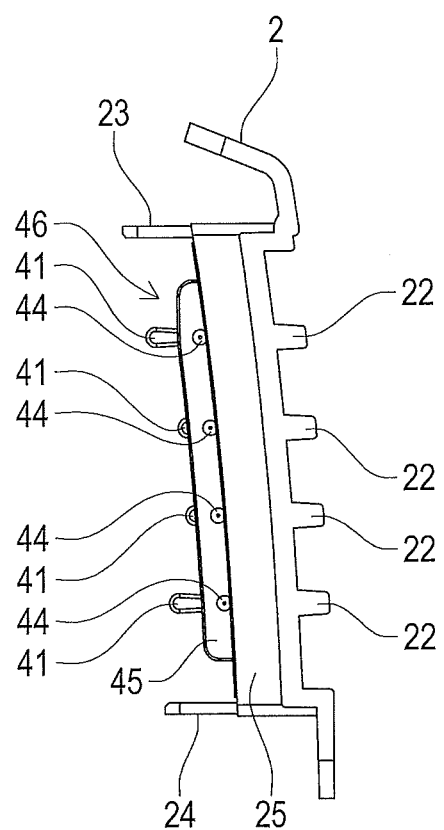
FIG. 34 is a side view of the bezel in which the frame with the front side fins is arranged.

The frame 71 for front side fins within which the fin structure 46 is received, is fitted within the surrounding rib 25 formed in the bezel 2, as shown in FIGS. 30 and 31 to 32.

[5. Positional Relation Between Fixed Fins and Front Side Fins]

Figure 35:
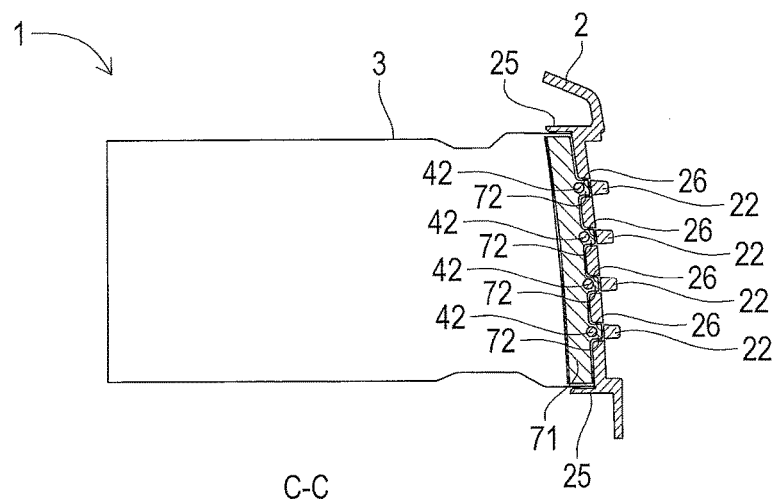
FIG. 35 is a sectional view of the register sectioned according to the C-C line shown in FIG. 2.

The bezel 2 in which the fin structure 46 is received within the surrounding rib 25, is fixed to the retainer 3. In this state, as shown in FIG. 35 corresponding to a sectional view of the register 1 sectioned along the C-C line in FIG. 2, each of the convex fit portions 72 (see FIG. 22) of the frame 71 is fitted in each of the concave fit portions 26 (see FIG. 9). Therefore, each of the rotational shafts 42 of the front side fins 41 is positioned at each of the concave fit portions 26 (see FIG. 9).

Figure 36:
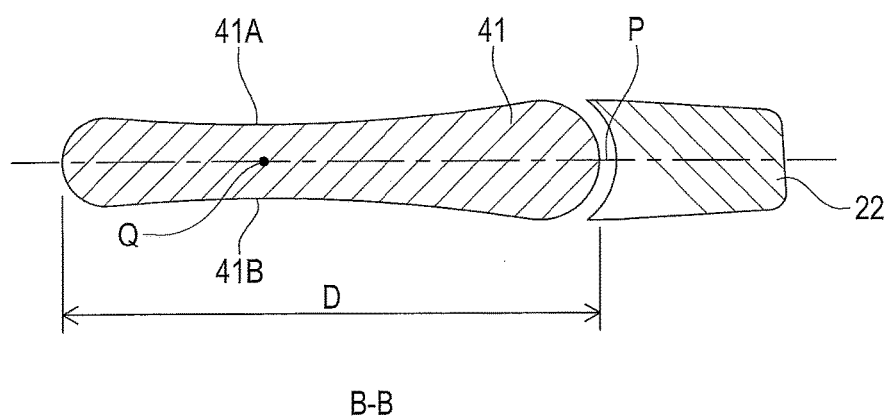
FIG. 36 is a sectional view of the front side fin and a fixed fin sectioned according to the B-B line shown in FIG. 2, where the front side fin is retained in a neutral state.

According to the above construction, as shown in FIG. 36 corresponding a sectional view of the fixed fin 22 and the front side fine 41 sectioned along the B-B line in FIG. 2, both the fixed fin 22 and the front side fin 41 adjacent with each other are always approaches and mutually separate while retaining a predetermined clearance P between the convex end surface of the front side fin 41 and the concave end surface of the fixed fin 22. Further, as shown in FIG. 36, when the front side fine 41 is retained under the neutral state (horizontal state), the front side fin 41 faces to the fixed fin 22 with no leaning.

[6. Sectional Shape of Front Side Fin]

As for the sectional plane of the fixed fin 22, showing in the sectional view indicated in FIG. 36, the thickness of the fixed fin 22 is almost as same as the thickness of the front side fin 41 at the side where the fixed fine 22 and the front side fin 41 mutually approach. On the other hand, the thickness of the fixed fin 22 is made slightly thinner according that the fixed fin 22 separates from the front side fine 41.

[7. Sectional Shape of Front Side Fin]

The sectional plane of the front side fin 41 shown in FIG. 36 is the sectional plane obtained by sectioning the front side fin 41 along the direction of depth D in the front side fin 41. As for the sectional plane of the front side fin 41, showing in FIG. 36, the sectional plane is defined by an upper surface 41A and a lower surface 41B. Both surfaces 41A and 41B are dent curved surfaces (so-called fillister shape) which are gradually curved in a bow shape. Furthermore, the thickness of front side fin 41 becomes minimum at almost center portion Q in the depth direction D of front side fin 41.

[8. Operation of Frnt Side Fin]

As shown in FIGS. 30, 31 and 32 to 34, the operation knob is inserted in the second fixed fin 22 an the second front side fin 41 counted from the upper side thereof. In that state, the connection rod 65 formed in the rear side fine 61 is slidably inserted between the pair of connection sections formed in the operation knob so as to be sandwiched between the connection sections, as shown in FIG. 3.

Figure 37:
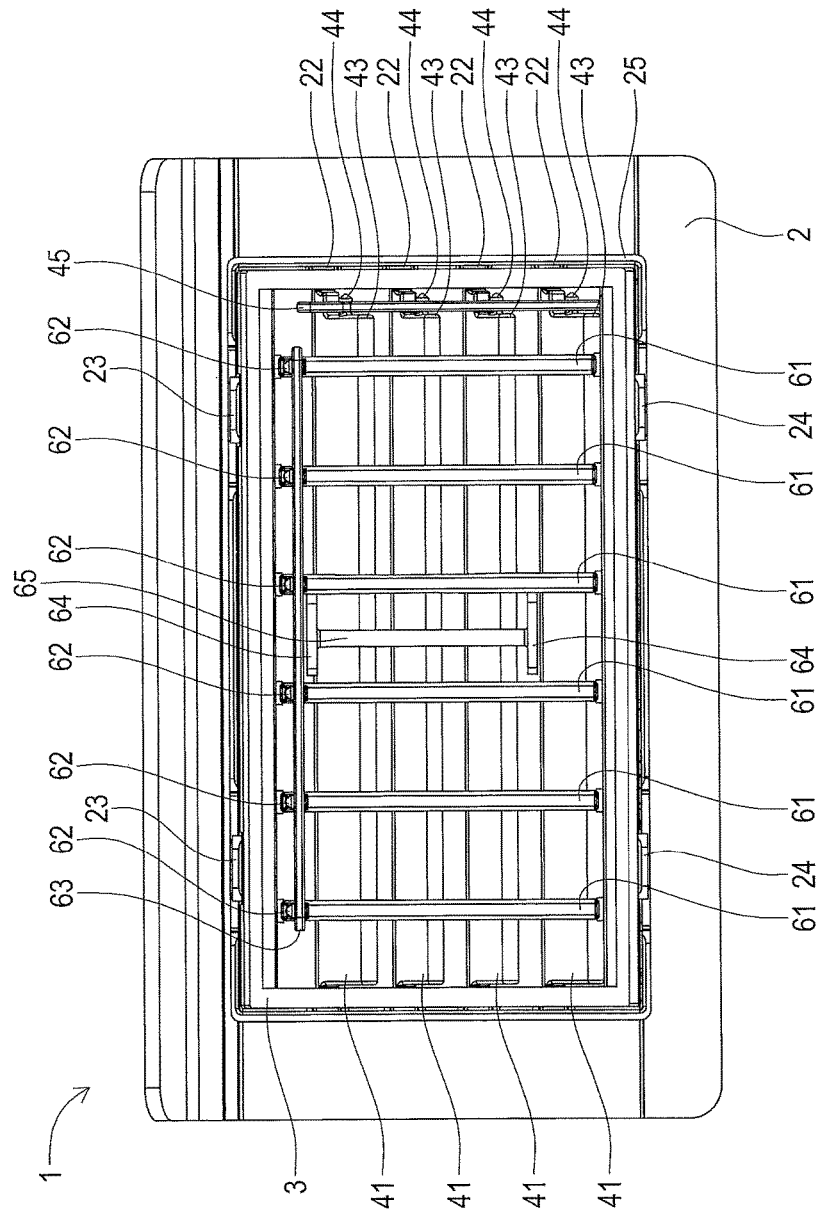
FIG. 37 is a rear view of the register where the front side fins are retained in an upward state.

Therefore, when the operation knob is operated in the upward direction, movement of the operation knob is transmitted to the second front side fin 41 from the upper side. Based on this transmission, when the second front side fin 41 from the upper side is rotated, the other front side fins 41 are rotated to the same direction at the same time through the connection shafts 44 and the connection rod 45. Thereby, as shown in FIGS. 37 and 39(a) (corresponding to the sectional view of the register 1 sectioned along the B-B line in FIG. 2), all of the front side fins 41 are made in a state that all fins 41 are rotated in the upward direction.

Figure 38:
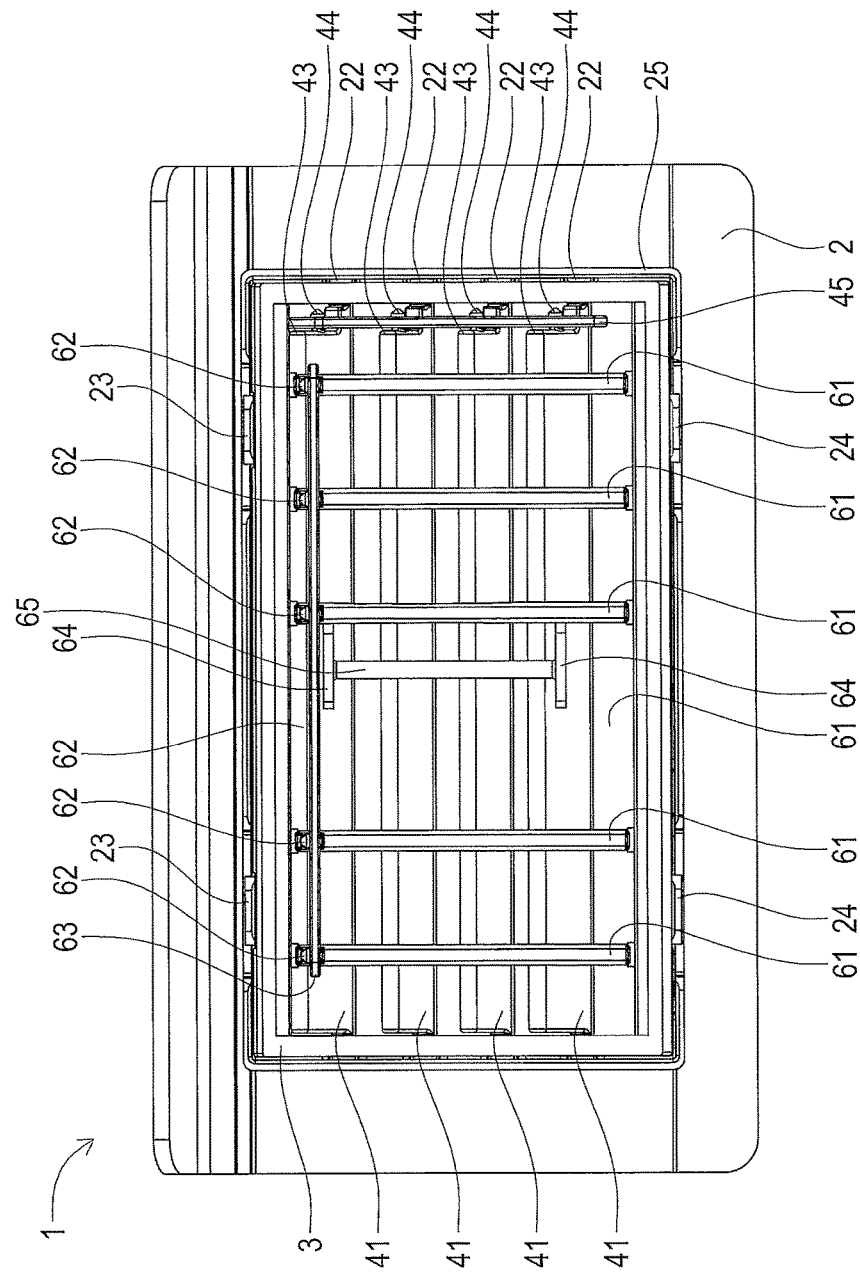
FIG. 38 is a rear view of the register where the front side fins are retained in a downward state.

On the other hand, when the operation knob is operated in the downward direction, movement of the operation knob is transmitted to the second front side fin 41 from the upper side. Based on this transmission, when the second front side fin 41 from the upper side is rotated, the other front side fins 41 are rotated to the same direction at the same time through the connection shafts 44 and the connection rod 45. Thereby, as shown in FIGS. 38 and 39(b) (corresponding to the sectional view of the register 1 sectioned along the B-B line in FIG. 2), all of the front side fins 41 are made in a state that all fins 41 are rotated in the downward direction.

Further, when the operation knob is operated to the neutral position from the state where the operation knob is operated in the upward direction shown in FIG. 39(a) or the state where the operation knob is operated in the down ward direction shown in FIG. 39(b), movement of the operation knob is transmitted to the second front side fin 41 from the upper side. Based on this transmission, when the second front side fin 41 from the upper side is rotated, the other front side fins 41 are rotated to the same direction at the same time through the connection shafts 44 and the connection rod 45. Thereby, as shown in FIGS. 3 and 39(c) (corresponding to the sectional view of the register 1 sectioned along the B-B line in FIG. 2), all of the front side fins 41 are made in a state that all fins 41 are rotated to the neutral position.

[9. Air Flow in Register]

As shown in FIGS. 39(a), 39(b) and 39(C) (corresponding to the sectional view of the register 1 sectioned along the B-B line in FIG. 2), air sent into the air flow path 3A of the retainer 3 flows along the air flow direction X facing to the air outlet 21 of the bezel 2. Air flowing toward the air outlet 21 is blown out from the air outlet 21 of the bezel 2. At that time, the air blowing direction is changed corresponding to the state of all front side fins 41.

As shown in FIG. 39(a), in case that all of the front side fins 41 are rotated to the upward direction, air flowing toward the air outlet 21 (air flowing direction X) within the air flow path 3A of the retainer 3 is changed and blown out from the air outlet 21 of the bezel 2 along the blowing direction Y1.

Concretely, in the register 1 of the embodiment, in case that all of the front side fins 41 are rotated to the upward direction, air that blowing direction is changed flows along arrows shown in FIG. 40(a). At that time, the arrow indicating air flow separate from the dent curved surface (so-called fillister shape) of the lower surface 41B of the front side fin 41 approaches the arrow indicating air flow along the dent curved surface (so-called fillister shape) of the upper surface 41A of the front side fine 41 positioned at a lower position than that of the above front side fin 41. Thereby, air with superior directivity to the upper direction can be obtained.

As shown in FIG. 39(b), in case that all of the front side fins 41 are rotated to the downward direction, air flowing toward the air outlet 21 (air flowing direction X) within the air flow path 3A of the retainer 3 is changed and blown out from the air outlet 21 of the bezel 2 along the blowing direction Y2.

Concretely, in the register 1 of the embodiment, in case that all of the front side fins 41 are rotated to the downward direction, air that blowing direction is changed flows along arrows shown in FIG. 40(b). At that time, the arrow indicating air flow separate from the dent curved surface (so-called fillister shape) of the upper surface 41A of the front side fin 41 approaches the arrow indicating air flow along the dent curved surface (so-called fillister shape) of the lower surface 41B of the front side fine 41 positioned at an upper position than that of the above front side fin 41. Thereby, air with superior directivity to the lower direction can be obtained.

As shown in FIG. 39(c), in case that all of the front side fins 41 are in the neutral state, air flowing toward the air outlet 21 (air flowing direction X) within the air flow path 3A of the retainer 3 is blown out from the air outlet 21 of the bezel 2 along the blowing direction Y3 parallel with the air flowing direction X.

Concretely, in the register 1 of the embodiment, in case that all of the front side fins 41 are in the neutral state, air flows along arrows shown in FIG. 40(c). At that time, the arrows indicating air flow separate from the dent curved surface (so-called fillister shape) of the upper surface 41A or the lower surface 41B of the front side fin 41 separates from the fixed fins 22, as a result, air with directivity to the neutral direction can be obtained.

Figure 40:
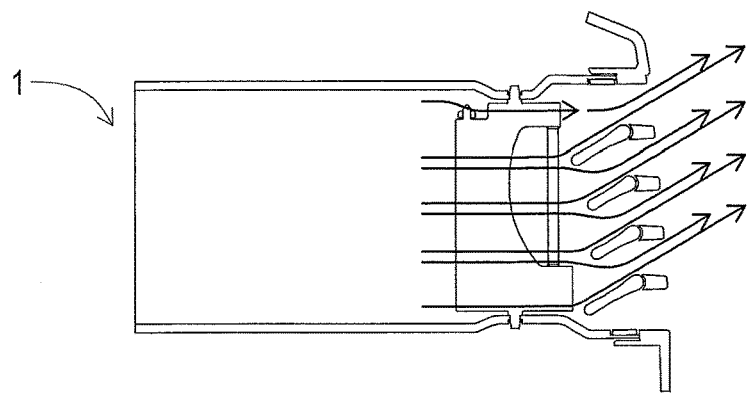
FIG. 40 is sectional views (a), (b), (c) each of which corresponds to each of sectional views (a), (b), (c) of FIG. 39, in each of the sectional views air blowing directions are indicated.
Figure 40:
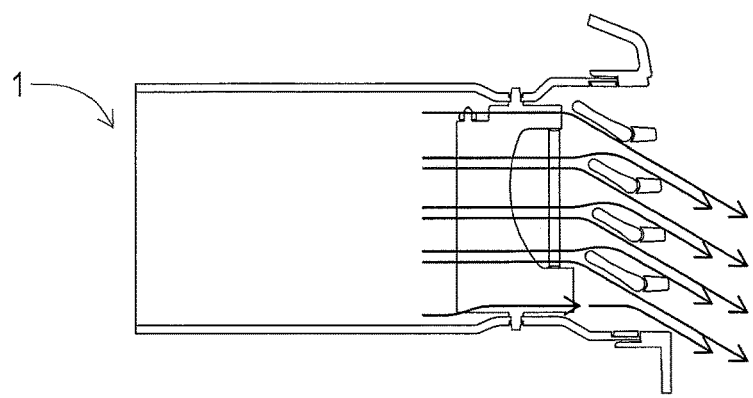
Figure 40:
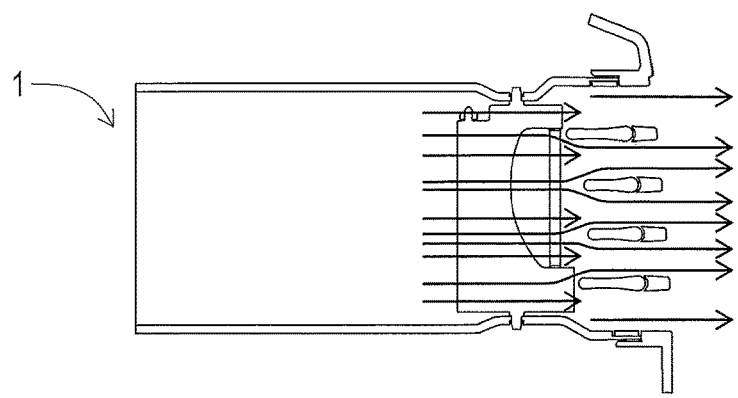

Here, in the sectional view shown in FIG. 40, slanted lines indicating the sectional plane are omitted to clearly indicate arrows showing air flow.

[10. Summary]

Hereinafter, the register 1 of the embodiment explained referring with FIGS. 1 to 40 will be summarized with reference to FIG. 41 corresponding to the sectional view of the register 1 sectioned along the A-A line in FIG. 2.

Figure 41:
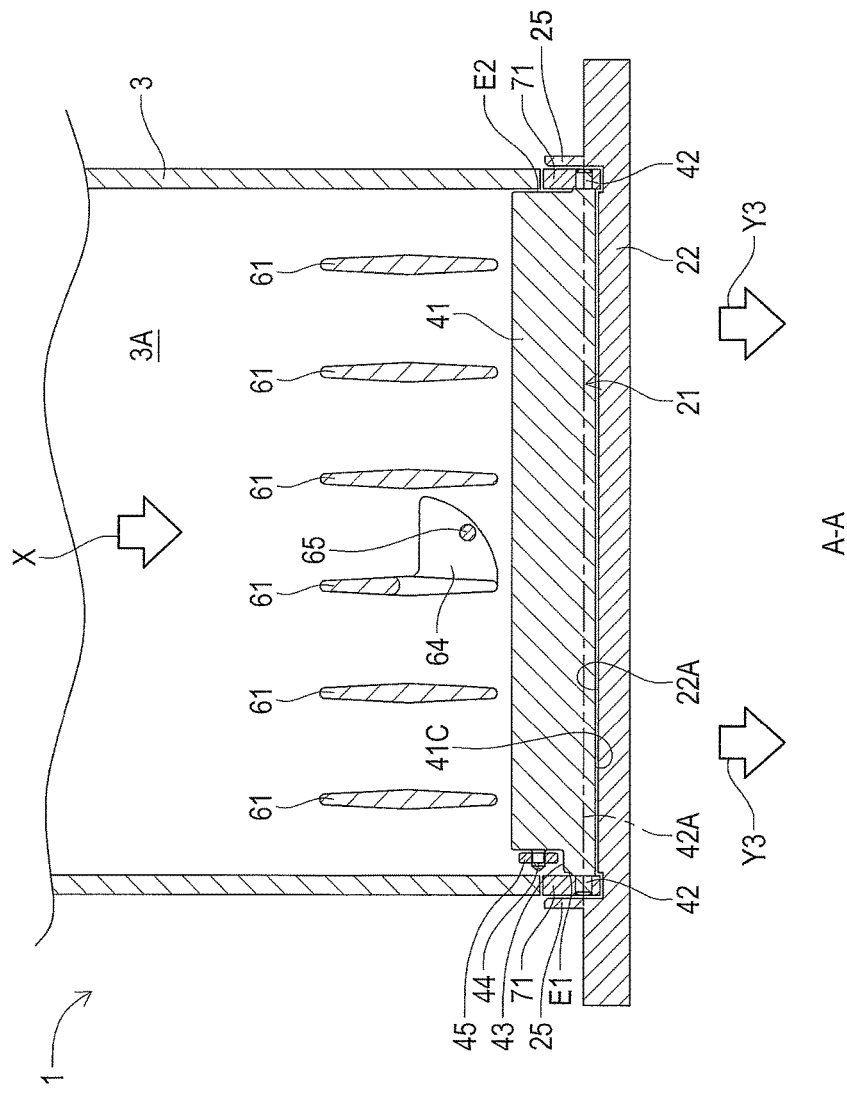
FIG. 41 is a sectional view of the register sectioned according to the A-A line shown in FIG. 2.

The sectional view shown in FIG. 41 corresponds to the sectional view obtained by sectioning the register 1 of the embodiment along the A-A line in FIG. 2. As shown in FIG. 41, the register 1 according to the embodiment has the bezel 2, the retainer 3, the front side fin 41 with the pair of rotational shafts 42 and the fixed fin 22.

In the bezel 2, the air outlet 21 is formed. In the retainer 3, it is formed the air flow path 3A communicating with the air outlet 21 and having the air flowing direction X advancing toward the air outlet 21 of the bezel 2. The front side fin 41 is made into a plate-like shape and changes the blowing direction Y3 of air sent in the air flow path 3A of the retainer 3 and blown out from the air outlet 21 of the bezel 2. The pair of rotational shafts 42 are formed on the both side ends E1, E2 of the front side fin 41, both shafts 42 being located at the downstream positions along the air flowing direction X within the side ends E1, E2. The rotations shafts 42 rotatably support the front side fine 41.

The fixed fin 22 is formed at the outside position of m the air outlet 21 (the downstream position of the air outlet 21 along the air flowing direction X), along the axis 42A passing through the center of each rotational shaft 42. Further, the edge portion 41C of the front side fin 41 existing at the downstream position along the air flow direction X is positioned at a near position to the edge portion 22A of the fixed fin 22 existing at the upstream position along the air flowing direction X and is separated from the edge portion 22A with a clearance therebetween (see FIG. 36). This construction is realized by that the pair of rotational shafts 42 rotatably supporting the front side fin 41 are fitted into the frame 71 and the frame 71 is fitted within the surrounding rib 25.

As shown in FIG. 36, the front side fin 41 has the upper surface 41A and the lower surface 41B which are dent curved surfaces (so-called fillister shape) which are gradually curved in a bow shape along the air flowing direction X (see FIG. 41: the direction parallel with the depth direction D of the front side fin 41 in the neutral state). Further, the thickness of front side fin 41 becomes minimum at almost center portion Q along the air flowing direction X (see FIG. 41: the direction parallel with the depth direction D of the front side fin 41 in the neutral state).

Therefore, according to the register 1 of the embodiment, when the plate-like front side fin 41 faces to the air flowing direction X with some angles (not parallel with the air blowing direction X: see FIGS. 39(a) and 39(b)), air flow sent into the air flow path 3A of the retainer 3 is blown out from the air outlet 21 of the bezel 2 along the upper surface 41A and the lower surface 41B of the front side fin 41 (see FIGS. 39(a) and 39(b)).

That is to say, under the neutral state, direction of air flow sent into the air flow path 3A of the retainer 3 is changed along dent curved surfaces of the front side fin 41 (so-called fillister shape) which are gradually curved in a bow shape along the air flowing direction X and has the minimum fin thickness at almost center portion Q along the air flowing direction X. Thereafter, air is blown out from the air outlet 21. Thereby, direction change of air sent into the air flow path 3A of the retainer 3 conducted through the front side fin 41 is hard to be affected by the fixed fin 22, as a result, directivity of blowing directions Y1, Y2 of air blown out from the air outlet 21 of the bezel 2 can be improved.

Figure 39:
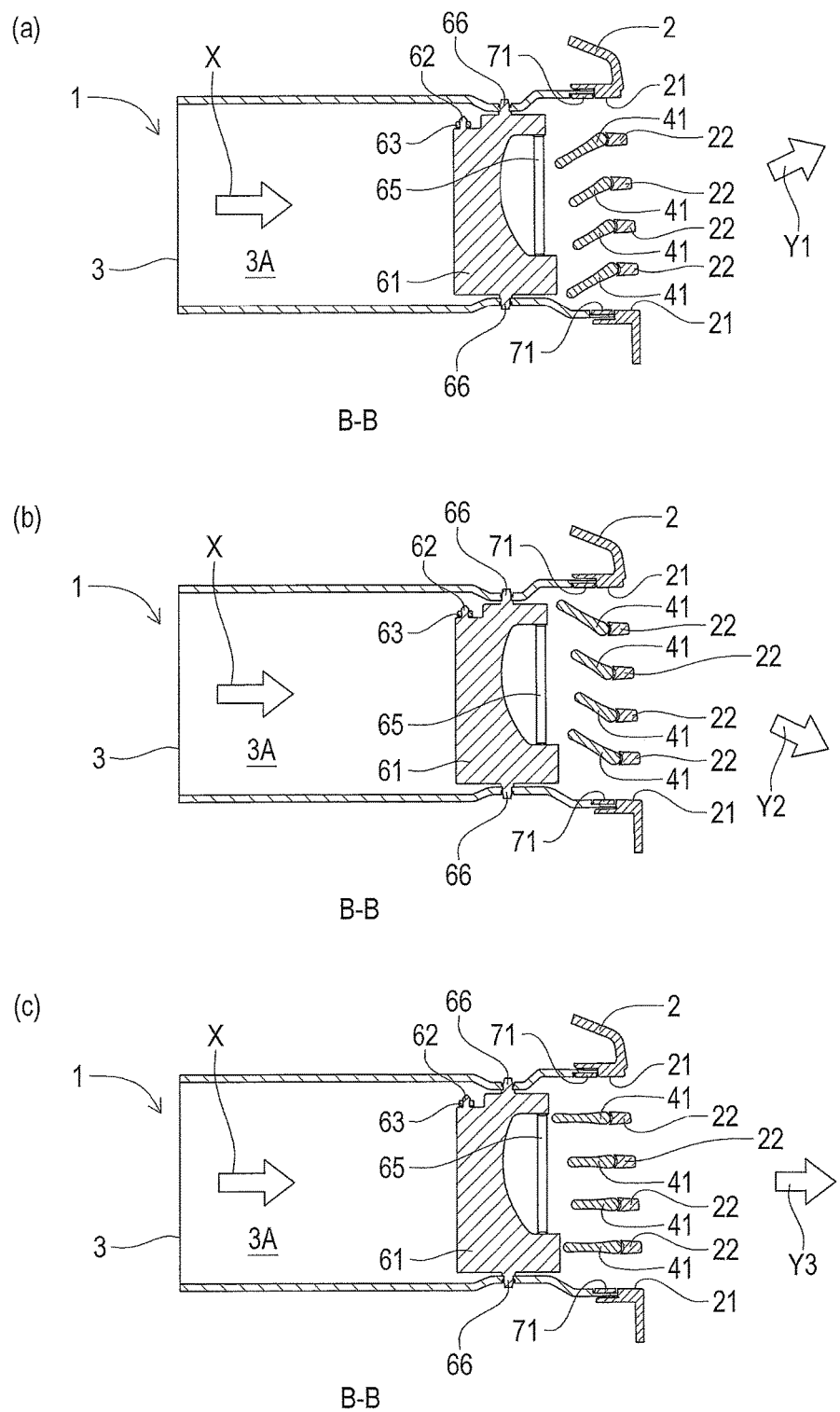
FIG. 39 is sectional views of the register, (a) is a sectional view of the register sectioned according to the B-B line shown in FIG. 2, where the front side fins are retained in the upward state, (b) is a sectional view of the register sectioned according to the B-B line shown in FIG. 2, where the front side fins are retained in the downward state, and (c) is a sectional view of the register sectioned according to the B-B line shown in FIG. 2, where the front side fins are retained in the neutral state.

Further, in the register 1 of the embodiment, the sectional shape of the fixed fin 22 sectioned along the vertical direction to the air flow direction X is formed so as to gradually become thinner (see FIG. 39). Thereby, direction change of air sent into the air flow path 3A of the retainer 3 conducted through the front side fin 41 is harder to be affected by the fixed fin 22.

Furthermore, in the register 1 of the embodiment, the edge portion 41C of the front side fin 41 existing downstream side of the air flow direction X and the edge portion 22A of the fixed fin 22 existing upstream side of the air flow direction X have a parallel relation with each other (see FIG. 41), based on which the edge portion 41C and the edge portion 22A never intersect.

Figure 42:
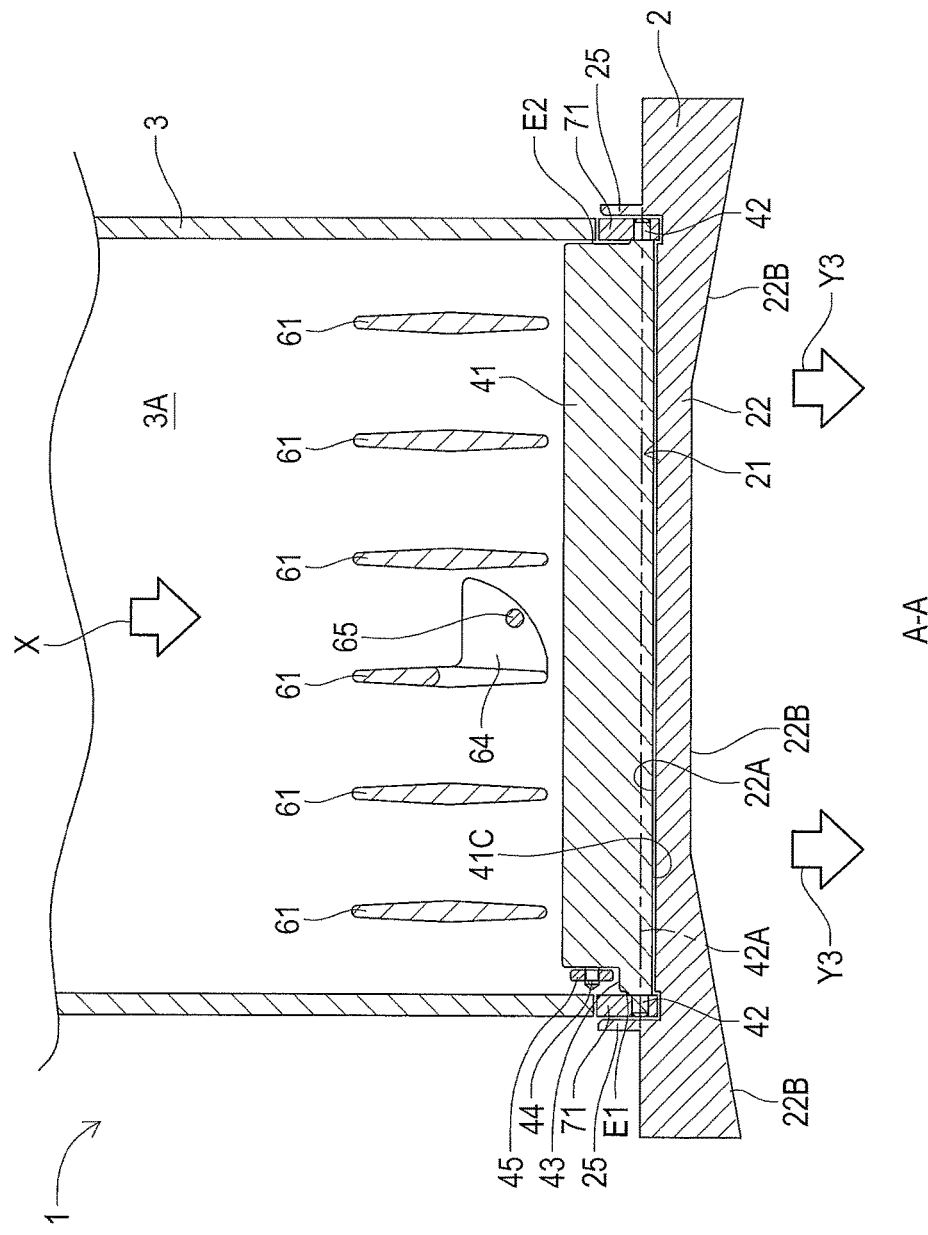
FIG. 42 is a sectional view of the register sectioned according to the A-A line shown in FIG. 2, where a modification of the fixed fin is disclosed.

Therefore, as shown in FIG. 42 for example, the shape of edge portion 22B positioned at the downstream side of the air flow direction X can be flexibly changed to a round shape. That is to say, in the register 1 of the embodiment, the shape of edge portion 22B of the fixed fin 22 positioned at the downstream side of the air flow direction X can be flexibly changed while using in common the front side fin 41 in the register of other model.

[11. Others]

Here, the present invention is not limited to the above embodiment and various modifications can be done within the scope of the present invention.

For example, in the register of the embodiment, although the fixed fins 22 and the front side fins 41 are laterally arranged and the rear side fins 61 are vertically arranged, the fixed fins 22 and the front side fins 41 may be vertically arranged and the rear side fins 61 may be laterally arranged, adversely.

What is claimed is:

1. A register comprising:
a bezel having an air outlet formed therein;
a retainer having an air flow path along which an air flow toward the air outlet occurs and which communicates with the air outlet;
a movable fin for changing a blowout direction of air sent into the air flow path of the retainer and blown out from the air outlet, the movable fin having an upstream end and a downstream end;
a pair of rotational shafts for rotatably supporting the movable fin, the rotational shafts being formed at side ends of the movable fin and positioned at a downstream side along an air flow direction on the side ends; and
a fixed fin positioned near the air outlet of the bezel, the fixed fin having an upstream side and a downstream side;
wherein the downstream end of the movable fin is arranged near an edge position of the fixed fin positioned at the upstream side along the air flow direction, the downstream end and the edge position of the fixed fin being separated with a clearance therebetween,
wherein both upper and lower surfaces of the movable fin each include a concave surface which gradually curves from the upstream end to the downstream end, and
wherein a thickness of the movable fin narrows from the upstream end of the movable fin to a minimum thickness along the airflow direction at a position between the upstream end and the downstream end of the movable fin, and the thickness of the movable fin thickens from the minimum thickness from the position to the downstream end.

2. The register according to claim 1, wherein a sectional shape of the fixed fin is formed so as to gradually become thinner from the upstream side toward the downstream side along the air flow direction.

3. The register according to claim 1, wherein the downstream end and the edge position of the fixed fin positioned at the upstream side along the air flow direction has a parallel relation therebetween.

4. The register according to claim 1, wherein the downstream end of the movable fin includes a convex shape and the edge position of the fixed fin includes a concave shape that corresponds to the convex shape of the downstream end.

5. A register comprising:
a bezel having an air outlet formed therein;
a retainer having an air flow path along which an air flow toward the air outlet occurs and which communicates with the air outlet;
a movable fin for changing a blowout direction of air sent into the air flow path of the retainer and blown out from the air outlet, the movable fin having an upstream end and a downstream end;
a pair of rotational shafts for rotatably supporting the movable fin, the rotational shafts being formed at side ends of the movable fin and positioned at a downstream side along an air flow direction on the side ends; and
a fixed fin positioned near the air outlet of the bezel, the fixed fin having an upstream side and a downstream side;
wherein the downstream end of the movable fin is arranged near an edge position of the fixed fin positioned at the upstream side along the air flow direction, the downstream end and the edge position of the fixed fin being separated with a clearance therebetween,
wherein the downstream end of the movable fin includes a convex shape and the edge position of the fixed fin includes a concave shape that corresponds to the convex shape of the downstream end, and
wherein both upper and lower surfaces of the movable fin each include a concave surface which gradually curves from the upstream end to the downstream end.

6. The register according to claim 1, wherein the thickness of the movable fin is a maximum at the downstream end of the movable fin on the downstream side along the air flow direction.

7. The register according to claim 5, wherein a thickness of the movable fin is a maximum at the downstream end of the movable fin on the downstream side along the air flow direction.

* * * * *